F. C. BRUNHOUSE.
SPEED CHANGING MECHANISM.
APPLICATION FILED OCT. 24, 1908.

921,078.

Patented May 11, 1909.

Witnesses
Philip G. Lang
Ralph E. Brunhouse

Inventor
Frederick C. Brunhouse

UNITED STATES PATENT OFFICE.

FREDERICK C. BRUNHOUSE, OF PHILADELPHIA, PENNSYLVANIA.

SPEED-CHANGING MECHANISM.

No. 921,078.　　　　　Specification of Letters Patent.　　　Patented May 11, 1909.

Application filed October 24, 1908. Serial No. 459,413.

*To all whom it may concern:*

Be it known that I, FREDERICK C. BRUNHOUSE, a citizen of the United States, residing in Philadelphia, in the county of Philadelphia and State of Pennsylvania, have invented certain new and useful Improvements in Speed-Changing Mechanisms, of which the following is a specification.

My invention relates to speed changing mechanisms, designed primarily for vehicles, where variable speeds are required.

My object is to provide a device of this character wherein the mechanism for the forward speeds and for the reverse is combined and arranged in a compact, effective and novel manner, and my aim is to simplify this combination so as to avoid unnecessary complications and to obtain compactness, durability, greater efficiency and ease of operation. This I accomplish by the means herein described and shown in the accompanying drawings.

Figure 1:
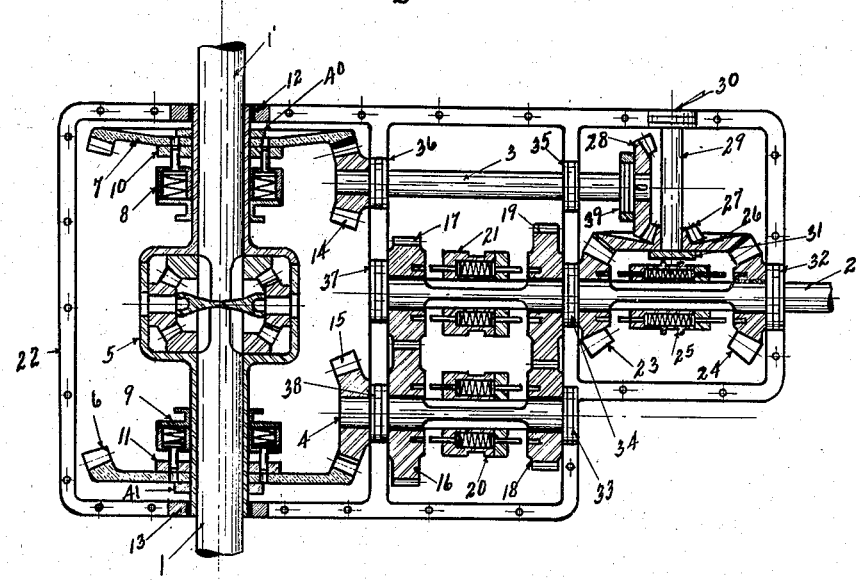
Figure 2:
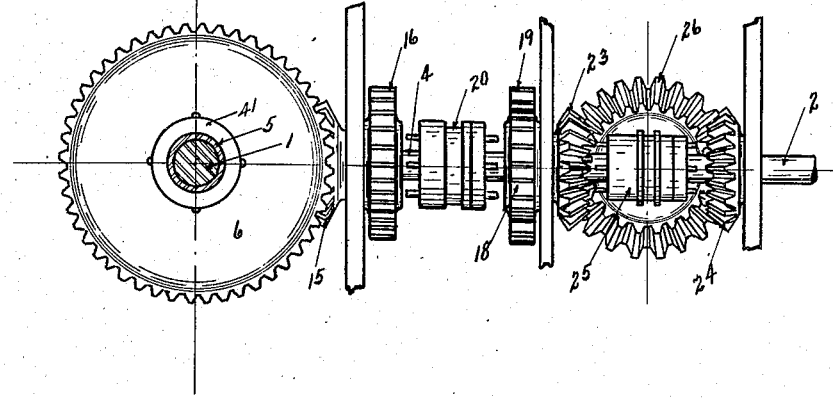

Figure 1 is a horizontal section of the entire mechanism inclosed in its casing. Fig. 2 is a side elevation of the mechanism shown in Fig. 1.

In Fig. 1, 1, 1′ is the rear axle of a vehicle where variable speeds are required, said rear axle being formed in two parts connected by differential mechanism in the usual manner. 2 is the power shaft, 3 and 4 are auxiliary shafts, 5 is the differential case which is rotatably mounted in the bearings 12 and 13, in the casing 22. Upon the differential case 5 is rotatably mounted free the driving gears 6 and 7, and are held in place thereon by collars 10 and 11. The spring-pin clutches 8 and 9 are rotatably mounted free on the differential case and are adapted to be slid thereon by any suitable lever (lever not shown) in and out, to engage driving gears 6 and 7. The gears 14 and 15 are mounted on the ends of auxiliary shafts 3 and 4 and remain constantly in mesh with the driving gears 6 and 7. The gears 16 and 18 are rotatably mounted free on auxiliary shaft 4 to be engaged by double faced spring-pin clutch 20 which is slidably mounted on auxiliary shaft 4. The gears 17 and 19 are rotatably mounted free on the power shaft 2 to be engaged by double faced spring-pin clutch 21, which is slidably mounted on power shaft 2 and constantly in mesh with gears 16 and 18. The bevel gears 23 and 24 are rotatably mounted free on power shaft 2, to be engaged by double faced spring-pin clutch slidably mounted on power shaft 2, and are permanently in mesh with bevel gear 26 of which bevel gear 27 is an integral part and is mounted on shaft 29 which in turn is rotatably mounted in the bearings 30 and 31. The bevel gear 27 is constantly in mesh with bevel gear 28 which is mounted on the end of auxiliary shaft 3. The power shaft 2 and auxiliary shafts 3 and 4 are supported and rotate in bearings 32, 33, 34, 35, 36, 37, 38 and 39 in the casing 22.

In my improved speed changing mechanism Fig. 1, the power shaft 2, and the auxiliary shafts 3 and 4 are not broken, thus permitting all the gears to remain constantly in mesh with each other and with the driving gears, but only those gears are used at any one time, which are required to procure the speed desired, while all the remaining ones are at rest.

Having thus described the component parts of my speed changing mechanism, I will now describe the manner in which the various speeds are obtained.

In the drawing the parts required to produce the variable speeds are disengaged or neutral. In Fig. 1, to obtain the high speed forward, the double faced spring-pin clutches 20 and 21 are brought into engagement with gears 18 and 19, and the spring-pin clutch 9 into engagement with driving gear 6. The power shaft 2 being in revolution, the power is transmitted through gear 19 to gear 18 on auxiliary shaft 4, auxiliary shaft 4 in turn transmits the power through gear 15 in mesh with driving gear 6, to driving gear 6, so that the rotation of the driving gear 6 is transmitted to the axle of the vehicle and produces the high speed forward. While the parts above described are thus engaged the other parts are at rest.

To obtain the intermediate speed forward disengage clutches 20 and 21 from gears 18 and 19 and bring clutches 20 and 21 into engagement with gears 16 and 17. The power is then transmitted through gear 17 on power shaft 2 to gear 16 on auxiliary shaft 4, shaft 4 in turn transmits the power through gear 15 to driving gear 6, which in like manner produces the intermediate speed forward. The difference between the high and the intermediate speeds being due to the difference in the relative diameters of gears 18 and 19 on the one hand and of gears 16 and 17 on the other.

The low speed forward is obtained by disengaging clutches 20 and 21 from 16 and 17, and clutch 9 from driving gear 6, the clutch 25 is then brought into engagement with bevel gear 24 on power shaft 2 and the clutch 8 into engagement with driving gear 7. The power is then transmitted through bevel gear 24 to bevel gear 26 on shaft 29. Gear 27 which is an integral part of gear 26 in turn transmits the power to bevel gear 28 on auxiliary shaft 3, shaft 3 in turn transmits the power through gear 14 which is in mesh with driving gear 7, to driving gear 7, so that the rotation of the driving gear 7 transmits the power to the axle of the vehicle and produces the low speed forward. Meanwhile all the other parts are at rest.

To obtain the reverse speed disengage clutch 25 from gear 24 and bring it into engagement with gear 23, and in like manner as above described to obtain the low speed forward, the reverse speed is procured.

What I claim as my invention and desire to secure by Letters Patent is:—

1. In a speed changing mechanism, two driven shafts, differential mechanism operatively connecting the same, comprising a case inclosing said shafts, a gear casing in which said case is rotatably mounted, clutches furnished with spring pressed clutch pins, mounted free upon said differential case, gears mounted free upon said differential case and furnished with clutch seats adapted to receive said clutch pins, collars mounted securely on said differential case, arranged between said clutches and said free gears and having clutch seats adapted to receive the clutch pins, a power shaft, double faced clutches slidably mounted thereon and furnished with spring-pressed clutch pins, gears mounted free on said power shaft and provided with seats adapted to be engaged by said clutch pins, an auxiliary shaft 4, a double faced clutch slidably mounted thereon and furnished with spring-pressed clutch pins, gears mounted free on said auxiliary shaft, in constant engagement with the corresponding gears on said power shaft and furnished with seats adapted to be engaged by said clutch pins, a gear secured upon said auxiliary shaft and engaging one of the free gears in said differential case, an auxiliary shaft 29 gears 27 and 26 secured thereon, the latter being in constant engagement with the corresponding free gears on said power shaft, and an auxiliary shaft 3 the gear 14 secured thereon in constant engagement with the remaining free gear on said differential case and the gear 28 in like engagement with gear 27, substantially as described.

2. In a speed changing mechanism, the combination with two driven shafts, differential mechanism operatively connecting the same, comprising a case inclosing said shafts, a gear casing in which said case is rotatably mounted, gears freely mounted upon said case, clutches freely mounted thereon and adapted to engage said gears, collars mounted securely on said differential case, arranged between said clutches and said free gears and having clutch seats adapted to receive the clutch pins, a power shaft, gears mounted free thereon, a clutch slidably mounted thereon between each pair of said gears and adapted to engage either one of the pair, an auxiliary shaft 4 free gears mounted thereon in engagement with the corresponding gears on the power shaft, a clutch slidable on said auxiliary shaft and adapted to engage either of the gears thereon, an auxiliary shaft 29 the gears 26 and 27 secured thereto, the gear 26 being in engagement with the corresponding gears on the power shaft, an auxiliary shaft 3 the gear 28 carried thereby in engagement with gear 27, and gears 14 and 15 secured upon auxiliary shafts 3 and 4 and in constant engagement with the free gears upon said differential case, substantially as described.

3. In a speed changing mechanism, in combination with two driven shafts, differential mechanism operatively connecting the same, comprising a case inclosing said shafts, a gear casing in which said case is rotatably mounted, gears freely mounted upon said case, clutches freely mounted thereon and adapted to engage said gears, collars mounted securely on said differential case, arranged between said clutches and said free gears and having clutch seats adapted to receive the clutch pins, a power shaft, a high speed transmission mechanism, consisting of gears 19 and 18 freely mounted on said power shaft and auxiliary shaft, adapted to be engaged by clutches 21 and 20, gear 15 secured on auxiliary shaft 4 and constantly in engagement with gear 6 mounted on said differential case, an intermediate speed transmission mechanism, consisting of gears 17 and 16 freely mounted on said power shaft and auxiliary shaft, adapted to be engaged by clutches 21 and 20, and constantly in engagement with gear 6 mounted on said differential case, a low speed transmission mechanism and reverse therewith, consisting of gears 23 and 24, clutch 25, shaft 29, gears 26 and 27, auxiliary shaft 3 gear 28 mounted thereon and also a gear 14 which is constantly in engagement with gear 7 on said differential case, substantially as described.

In testimony whereof I herewith affix my signature in presence of two witnesses.

FREDERICK C. BRUNHOUSE.

Witnesses:
PHILIP G. LANG,
RALPH E. BRUNHOUSE.